United States Patent [19]

Ebner

[11] Patent Number: 4,888,259

[45] Date of Patent: Dec. 19, 1989

[54] ELECTRODE COMPOSITION AND METHOD OF MAKING

[75] Inventor: Walter B. Ebner, Warminster, Pa.

[73] Assignee: Honeywell Inc., Minneapolis, Minn.

[21] Appl. No.: 279,890

[22] Filed: Dec. 5, 1988

[51] Int. Cl.$^4$ .................... H01M 4/62; B05D 5/12
[52] U.S. Cl. .................................. 429/217; 427/58; 427/122; 428/467
[58] Field of Search ............... 429/217; 427/58, 122; 428/467

[56] References Cited

U.S. PATENT DOCUMENTS

| | | |
|---|---|---|
| 1,717,171 | 6/1929 | Schorger . |
| 3,343,995 | 9/1967 | Reid et al. ........................... 427/122 |
| 3,399,451 | 9/1968 | Smith-Johannson ........... 427/122 X |
| 4,188,823 | 2/1980 | Espenscheid et al. .............. 106/278 |
| 4,565,751 | 1/1986 | Faust et al. .......................... 429/44 |
| 4,608,325 | 8/1986 | Ismail .................................. 429/217 |

Primary Examiner—Stephen J. Kalafut
Attorney, Agent, or Firm—R. W. Jensen; C. G. Mersereau

[57] ABSTRACT

The application discloses drying oil binder materials for use in improving cathode adhesion to thin metal current collectors and methods of applying them.

20 Claims, 1 Drawing Sheet

DISCHARGE PROFILES FOR LITHIUM CELLS EMPLOYING SLURRY-COATED $V_2O_5$ CATHODES

DISCHARGE PROFILES FOR LITHIUM CELLS EMPLOYING SLURRY-COATED $V_2O_5$ CATHODES

ELECTRODE COMPOSITION AND METHOD OF MAKING

The Government has rights in this invention pursuant to Contract No. DAAL01-86-C-0004 awarded by the Department of the Army.

BACKGROUND OF THE INVENTION

1. Field of the Invention

The present invention relates generally to the field of electrochemical cells and to the processing of electrodes for such cells. More particularly, the invention addresses improved binder materials for use in improving cathode adhesion to thin metal current collectors.

2. Related Art

Cathode processing is a critical element in the development of any battery technology as the physical properties of finished cathodes determine, to a large extent, the performance capabilities of the resulting cells and batteries. Cathode processing also represents a significant portion of the total cell and/or battery cost. This adds importance to the necessity of the development of low-cost, production-oriented manufacturing techniques in order to make products practical with any applicable electrochemical technology.

Binders are an essential component of any cathode technology. The purpose of the binder is to hold the electrode materials together, giving the structure ruggedness and the ability to be handled easily without damage. It is also often highly desirable that the binder possess elastomeric qualities in order to produce flexible cathodes suitable for spirally-wound electrode configurations. These properties must be achieved, however, while porosity and electrical conductivity are still maintained throughout the bulk of the electrode. Of course, it is also essential that the binder material be inert to the electrolyte solution employed and be electrochemically inactive at the normal operating potentials of the cell. To date, Teflon (Trademark of the duPont Company, Wilmington Del.) or polytetrafluoroethylene (PTFE) has been the predominant binder material employed in non-aqueous, specifically lithium, cells.

For the most part, Teflon-bonded electrodes have been found to offer excellent physical and performance (electrochemical) characteristics. One major drawback which has been encountered with Teflon-bonded electrodes, however, is the fact that Teflon is highly reactive with lithium metal and this can cause safety problems if such cells are over discharged to the point where lithium is electrochemically deposited at the cathode.

In addition, more recent work with regard to rechargeable lithium systems involves the development of thin cathodes. The purpose of this is to increase the electrode surface area that can be packaged within a given cell volume and thus reduce the local current densities to the lowest possible levels. It is expected that this thin cathode technological approach will significantly improve the operating efficiencies and cycle life capabilities of such cells.

One method to achieve very thin electrodes is to coat thin layers of the active cathode material onto metal foil substrates. This has been done with slurry-coating processes including dip coating, spraying, or painting, all of which are production-oriented and potential low-cost techniques. For this approach to be successful, of course, good adhesion of the cathode material to the substrate must be achieved.

Here the traditional Teflon material again falls short. Although PTFE is a good material for binding the electrode material itself together, it is not particularly well suited to laminating powder cathode materials to metal foil substrates.

For these and other reasons a need has existed to develop alternate binders which are chemically inert to alkali metals or other reactive species in the cell and which, at the same time, possess good adhesive properties with regard to binding the electrode material together and to metal foil substrates. This has led to much work in the field to find suitable replacement binding materials.

SUMMARY OF THE INVENTION

The present invention addresses improvements in thin cathode processing technology based on the use of certain drying oils as binders. The cathode material is normally combined with a drying oil binder and a solvent and thereafter applied to a cathode current collector. The use of one or more drying oils greatly enhances the adhesion of the cathode material to the current collector. This can be done without sacrificing cell performance. The cathode material or mix normally contains an active cathode material such as finely divided $V_2O_5$ in combination with a carbon additive which is used to make the electrode electrically conducting. It is believed, however, that cathodes of carbonaceous material alone are also viable. The cathode material is preferably applied by painting or spraying onto the surface of the current collector from a slurry of the material in a solvent/binder solution. Excess solvent is then removed by evaporation.

Drying oils may be defined as those oils that react with oxygen to form a dry, hard and insoluble resinous material. These and similar compounds have been extensively used as binders in paints, varnishes, lacquers, enamels, and the like. They include such naturally occurring substances as linseed oil, sunflower oil, tung oil, soybean oil, oiticica oil, tall oil, isanto oil and others including various fish oils. As binders, the drying oils can be used alone or in combination with synthetic or natural resins, such as rosin which serve to strengthen the films formed and, in some cases can impact thermoplastic properties to the films. Solvents that have been successfully employed with drying oil binders include n-butanol and turpentine.

Drying oils can be used with a wide variety of cathode materials but preferred materials include carbons, such as acetylene black and Vulcan XC-72R carbon (trademark of Cabot Corporation of Boston, Mass.) and solid oxidants, such as vanadium pentoxide ($V_2O_5$), and combinations thereof. Cathode current collectors can be either solid foil or grid structures and can be constructed from metals including nickel, aluminum, or various stainless steels depending on the nature of the electrochemical system being employed. 316 stainless steel is the preferred material for use with $V_2O_5$ cathodes.

BRIEF DESCRIPTION OF THE DRAWINGS

In the drawings:

The lone FIGURE, is a graphical representation of cell potential versus discharge capacity for non-aqueous lithium cells having $V_2O_5$ cathodes using drying oil versus PTFE binders.

DESCRIPTION OF THE PREFERRED EMBODIMENTS

Figure 1:
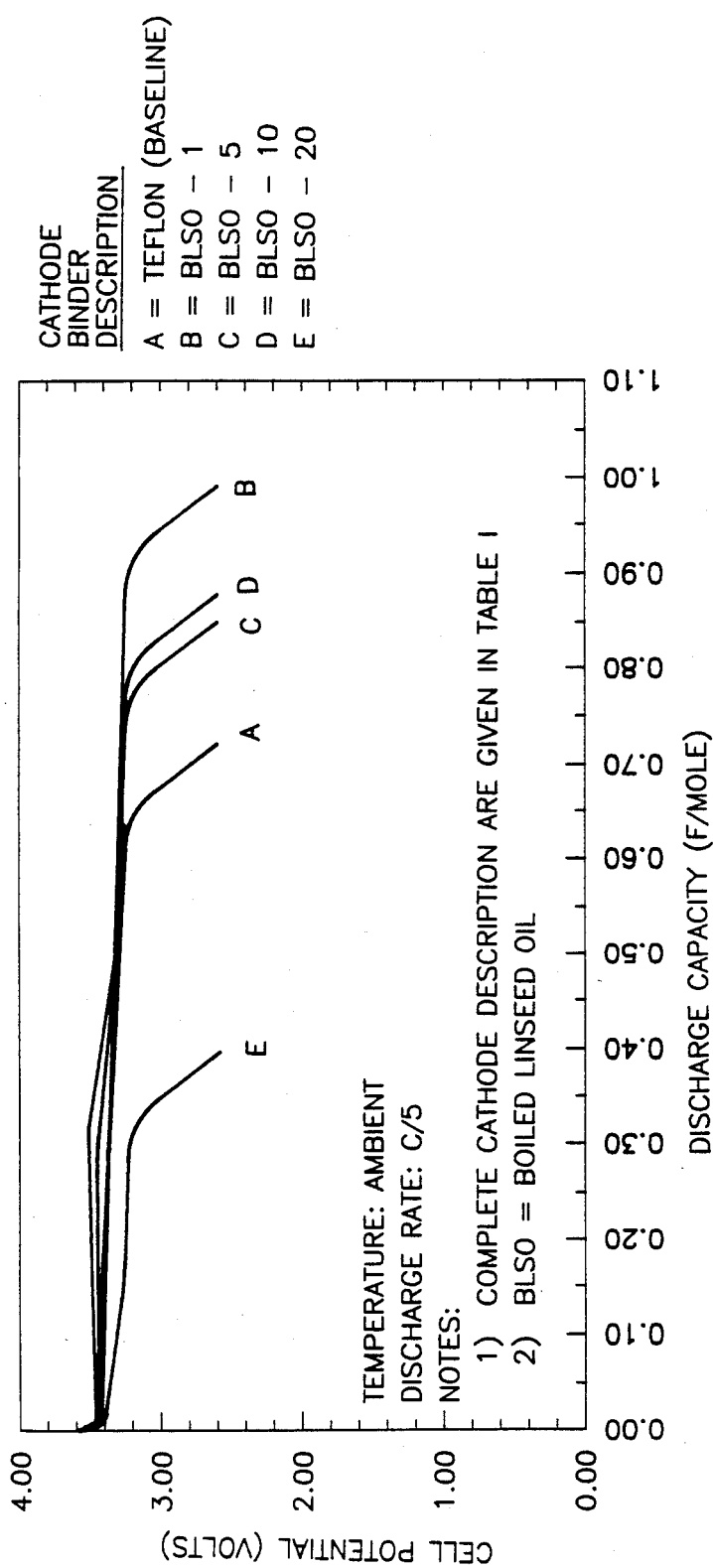

The particular examples utilized in the present specification are directed toward cathodes consisting principally of $V_2O_5$ and the particular drying oil demonstrated is linseed oil. It is believed, however, that the technology involved can be readily extended to other cathode materials and drying oils as the particular adaptation requires. Therefore the examples are presented as being merely illustrative of possible embodiments and not as limiting the scope of the invention.

The cathodes containing the linseed oil binder were produced by a painting technique using a fine particle size grade of $V_2O_5$ and n-butanol as the slurry solvent. The cathode substrate was 0.002 inch thick 316 stainless steel foil and the cathodes contained 20 weight percent of Vulcan XC-72R carbon as a conductive diluent.

Evaluation of the fabricated cathodes was accomplished by building them into small lithium cells and then discharging the cells at the five hour rate. The cells all employed a 2M $LiAsF_6$+0.4M $LiBF_4$/methyl formate (MF) electrolyte solution. Cathodes made with a Teflon binder acted as the control samples in these experiments and thus provided the baseline performance from which to judge the capabilities of the cathodes incorporating the drying oil binders. Table I summarizes the physical characteristics of the manufactured cathodes while Table II gives their electrochemical performance. The actual discharge profiles for the various cells are shown in FIG. 1. Cathodes made with solutions containing about 10 volume percent or less of linseed oil were found to yield fair to very good adhesion combined with efficient discharge performance. In fact, these cathodes all performed better than the baseline cathodes.

The low capacity achieved with the cathode made using higher concentrations such as a 20 volume percent linseed oil in n-butanol solution indicates that high concentrations of linseed oil may degrade porosity and/or electrical conductivity of the electrodes. For these $V_2O_5$ electrodes, therefore, a 10 volume percent linseed oil in n-butanol solution appears to be near optimum and yields electrodes having good adhesion combined with good electrochemical performance.

Compatibility of binder materials with the electrolyte solutions used in cells is always a key concern. Postmortem analysis of the discharged cells employing linseed oil-bonded electrodes revealed no loss in adhesion of the cathode coating to the metal foil substrate and there was no evidence of any degradation of the linseed oil binder.

These results demonstrate not only the feasibility of using drying oils as binders in cathodes for electrochemical cells, but also the superiority of drying oil binders over conventional Teflon binders, in terms of both adhesion and performance, in cathodes made by slurry coating techniques. The cathodes of the invention clearly represent a decided improvement.

TABLE I

DESCRIPTION OF SLURRY-COATED $V_2O_5$ CATHODES

| Cathode Mix Composition, w/o | | | | | | | |
|---|---|---|---|---|---|---|---|
| $V_2O_5$ | Vulcan XC-72R Carbon | Teflon | Slurry Solvent | Drying Oil | Drying Oil Content in Solvent, v/o | Coating Thickness, inches | Coating Adhesion |
| 85 | 10 | 5 | Water | — | — | 0.010 | Good |
| 90 | 10 | — | n-Butanol | BLSO | 1 | 0.007 | Fair–Good |
| 90 | 10 | — | n-Butanol | BLSO | 5 | 0.009 | Good |
| 90 | 10 | — | n-Butanol | BLSO | 10 | 0.006 | Very Good |
| 90 | 10 | — | n-Butanol | BLSO | 20 | 0.005 | Excellent |

Notes
[1]BLSO = Boiled Linseed Oil
[2]All cathodes were prepared by painting cathode mix slurries onto 0.002 inch thick stainless steel foil.

TABLE II

DISCHARGE PERFORMANCE RESULTS FOR LITHIUM CELLS EMPLOYING SLURRY-COATED $V_2O_5$ CATHODES

| Cathode Mix Composition, w/o | | | Slurry Solvent | Binder | Binder Content in Solvent, v/o | Discharge Efficiency, % | Average Voltage $V_o$ |
|---|---|---|---|---|---|---|---|
| $V_2O_5$ | Carbon | Teflon | | | | | |
| 85 | 10 | 5 | Water | Teflon | — | 72.6 | 3.213 |
| 90 | 10 | — | n-Butanol | BLSO | 1 | 98.0 | 3.223 |
| 90 | 10 | — | n-Butanol | BLSO | 5 | 84.0 | 3.192 |
| 90 | 10 | — | n-Butanol | BLSO | 10 | 87.4 | 3.196 |
| 90 | 10 | — | n-Butanol | BLSO | 20 | 40.5 | 3.157 |

Notes:
1. The cells were discharged at the C/5 rate to a 2.5V cutoff.
2. BLSO = Boiled Linseed Oil

What is claimed is:

1. A cathode for an electrochemical cell comprising a thin metal current collector, a coating on said thin metal current collector consisting essentially of finely divided carbonaceous material and an amount of drying oil binder.

2. A cathode for an electrochemical cell comprising a thin metal current collector, a coating on said thin metal current collector consisting essentially of an amount of finely divided carbonaceous material, an amount of active cathode material and an amount of drying oil binder.

3. The cathode of claim 1 wherein said binder material consists essentially of one or more drying oils selected from the group consisting of linseed oil, safflower oil, tung oil, soybean oil, oiticica oil, tall oil, isano oil, and fish oils.

4. The cathode of claim 2 wherein said binder material consists essentially of one or more drying oils selected from the group consisting of linseed oil, safflower oil, tung oil, soybean oil, oiticica oil, tall oil, isano oil, and fish oils.

5. The cathode of claim 2 wherein said binder further consists of an amount of resin.

6. The cathode of claim 4 wherein said binder further consists of an amount of resin.

7. The cathode of claim 3 wherein said drying oil is boiled linseed oil.

8. The cathode of claim 4 wherein said drying oil is boiled linseed oil.

9. The cathode of claim 6 wherein said drying oil is boiled linseed oil.

10. A cathode for an electrochemical cell comprising a metal foil current collector wherein said foil is selected from the group including nickel, aluminum, and stainless steels, a coating on said metal foil consisting essentially of finely divided $V_2O_5$, finely divided acetylene black carbonaceous material and an amount of drying oil binder.

11. The cathode of claim 10 wherein said binder is one selected from the group consisting of linseed oil, boiled linseed oil and safflower oil or mixtures thereof.

12. The cathode of claim 11 wherein said drying oil is boiled linseed oil.

13. A method of making a cathode for an electrochemical cell of the type including a coated thin metal foil or grid current collector comprising the steps of:
forming a slurry of an amount of finely divided carbonaceous material and an amount of drying oil binder in a solution of a solvent capable of wetting the cathode mix, including the binder, and the metal of the current collector;
applying a layer of said slurry to the surface of said current collector; and
removing excess solvent.

14. A method of making a cathode for an electrochemical cell of the type including a coated thin metal foil or grid current collector comprising the steps of:
forming a slurry of an amount of finely divided carbonaceous material, and an amount of a finely divided solid active cathode material and an amount of drying oil binder in a solution of a solvent capable of wetting the cathode mix, including the binder and the metal of the current collector;
applying a layer of said slurry on the surface of said current collector; and
removing the excess solvent.

15. The method of claim 14 wherein said current collector consists of a foil selected from aluminum, nickel and stainless steel, said active cathode material is $V_2O_5$, said binder is boiled linseed oil and said solvent is n-butanol.

16. The method of claim 15 wherein the dry cathode mix comprises about 9 parts $V_2O_5$ to 1 part carbonaceous material by weight and the slurry contains less than 20 volume percent boiled linseed oil.

17. The method of claim 13 wherein the excess solvent is removed by evaporation.

18. The method of claim 14 wherein the excess solvent is removed by evaporation.

19. The method of claim 15 wherein the excess solvent is removed by evaporation.

20. The method of claim 16 wherein the excess solvent is removed by evaporation.

* * * * *